United States Patent
Jacobsen et al.

(10) Patent No.: US 6,922,448 B1
(45) Date of Patent: Jul. 26, 2005

(54) UPSTREAM POWER BACK-OFF

(75) Inventors: Krista S Jacobsen, San Jose, CA (US); Brian R Wiese, San Francisco, CA (US); Celite Milbrandt, Austin, TX (US)

(73) Assignee: Texas Instruments Incorporated, Dallas, TX (US)

( * ) Notice: Subject to any disclaimer, the term of this patent is extended or adjusted under 35 U.S.C. 154(b) by 720 days.

(21) Appl. No.: 09/715,811

(22) Filed: Nov. 17, 2000

Related U.S. Application Data

(60) Provisional application No. 60/166,092, filed on Nov. 17, 1999.

(51) Int. Cl.[7] .............................................. H04L 27/04
(52) U.S. Cl. ...................................................... 375/295
(58) Field of Search ................................ 375/295, 130, 375/229, 346, 278, 222, 221, 224; 709/224, 200; 379/417, 27, 414, 90.01

(56) References Cited

U.S. PATENT DOCUMENTS 6,128,350 A * 10/2000 Shastri et al. ............... 375/260
6,205,220 B1 * 3/2001 Jacobsen et al. ............ 379/417
6,650,697 B1 * 11/2003 Tate et al. ................... 375/222

\* cited by examiner

*Primary Examiner*—Khai Tran
(74) *Attorney, Agent, or Firm*—Abdul Zindani; W. James Brady, III; Frederick J. Telecky, Jr.

(57) ABSTRACT

The present invention provides a system and method of an upstream power back-off in a very high rate Digital Subscriber Line (VDSL) system. The method is based on a global desired receive PSD (GDR PSD), which is used to determine an upstream power back-off algorithm. The GDR PSD is transmitted from the transceiver at the LT to the NT during initialization. The NT determines an upstream transmit power spectral density for data transmission using the received GDR PSD and a determined insertion loss of the loop on which it resides.

22 Claims, 1 Drawing Sheet

UPSTREAM POWER BACK-OFF

CROSS REFERENCE TO RELATED APPLICATIONS

Priority is claimed of commonly assigned copending U.S. Provisional patent application, Ser. No. 60/166,092, filed Nov. 17, 1999, entitled "Proposal to Use The Noise Floor Method for Upstream Power Backoff In VDSL," the teachings included herein by reference.

BACKGROUND OF THE INVENTION

1. Technical Field of the Invention

The present invention relates generally to the field of broadband communications and, more particularly, to a method and system of upstream power back-off within a broadband communication system.

2. Background of the Invention

It is becoming increasingly clear that telephone companies around the world are making decisions to include existing twisted-pair loops in their next generation broadband access networks. One attractive alternative, known as fiber-to-the-neighborhood (FTTN), is a combination of fiber cables feeding neighborhood Optical Network Unites (ONUs) and last leg premises connections by existing or new cooper. One of the enabling technologies for FTTN is very high rate Digital Subscriber Line (VDSL). VDSL transmits high speed data over short reaches of twisted-pair copper telephone lines, with a range of speeds depending upon actual line length and direction of transmission.

A VDSL requirement to use power back-off in the upstream direction arises because distributed topologies must be presumed for VDSL. In general, power back-off causes decreases in data rates relative to when all loops are the same length and only equal-length crosstalk results. However, it is difficult to project what the data rate loss will be with a particular power back-off algorithm. The data rates are a function of the loop topology and power back-off parameters.

Referring now to FIG. 1, there is illustrated a broadband access network with a plurality of varying length transmission lines in which the lines terminate at an ONU 10. Projections of downstream VDSL performance that assume self-FEXT are pessimistic when lines of varying lengths reside in the same binder as in FIG. 1. The assumption of self-FEXT is more accurate for short lines, on which FEXT levels are highest. For long lines, the assumption of self-FEXT is pessimistic because the shorter lines do not couple over the entire length of the long lines.

In the upstream direction, however, the assumption of self-FEXT is optimistic for longer lines. If all VTU-Rs transmit at their maximum power spectral density (PSD) levels, signals on shorter lines will detrimentally affect the upstream performance on longer lines. To illustrate, assume the maximum VDSL transmit PSD is −60 dBm/Hz. Referring to FIG. 1, the signal transmitted by the VTU-R on $L_N$ at this level will be attenuated significantly by the time it travels a distance $(d_N-d_l)$. At this point, transmissions from the VTU-R on $L_l$ may begin to couple into $L_N$. If the transmit PSD of the VTU-R on $L_l$ is −60 dBm/Hz, then it is significantly higher than the attenuated level of the desired signal on $L_N$. The result of the relatively high-power interference is a degradation in achievable upstream rate on $L_N$.

Simulations to project VDSL performance generally assume that any far-end crosstalk at the VDSL receiver is due to disturbers that are identical to the line under consideration. In other words, it is assumed that all disturbers span the same distance and transmit the same power spectrum as the line under consideration, and "self-FEXT" results. In reality, lines emanating from a single ONU, CO or LEx may span a variety of distances in a distributed topology, as shown by the example in FIG. 1.

The near-far problem is most severe when a very long line is degraded by FEXT caused by shorter lines on which "too high" an upstream transmit PSD is used. Loosely speaking, the transmit PSD on a short line is "too high" if its level is significantly higher than the level of the signal on the long line at the point at which the shorter line begins to couple into the longer line.

SUMMARY OF THE INVENTION

The present invention achieves technical advantages as a system and method of power back-off in a broadband communication system and more particularly for a very high rate digital subscriber line (VDSL) system. The present invention defines a global desired receive power spectral density (GDR PSD). Further, a line termination (LT) enables transmission of the determined GDR PSD to a network termination (NT). The NT determines an upstream transmit power spectral density for data transmission using the received GDR PSD and a determined insertion loss of the loop on which it resides. A management interface can also enable operator configuration of GDR PSD parameters. In some cases, depending on the power back-off algorithm being implemented, normalization by a well-defined factor is also necessary. Specific advantages include enabling power back-off by the NTs without data feedback to the LT but still allows the power back-off parameters, or even the algorithm itself, to be modified via the management system.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
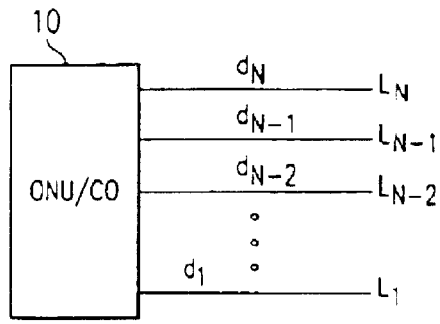
FIG. 1 illustrates a broadband access network with a plurality of varying length transmission lines.

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

Several power back-off algorithms are described for use in VDSL. In all cases, a PSD mask constraint $S_{max}(f)$ is assumed. Hence, it is necessary always to take the minimum of the computed PSD and the PSD mask. Using a constant power back-off method, the upstream transmit PSDs on shorter lines are reduced equally across the upstream frequency band. Thus, the transmit PSD, which may or may not be flat, is reduced by a constant factor such that it resides no higher than the maximum allowed VDSL level within the frequency band(s) allocated for upstream transmission. The amount by which the PSD is reduced is computed using a desired receive PSD at a reference frequency and either a model or measurements of the actual loop transfer function, which provides the loop attenuation at the reference frequency. The required transmit PSD level is then simply the desired received PSD at the reference frequency divided by the attenuation of the loop at the reference frequency. Using this method, the upstream PSD level is set so the received PSD level at the reference frequency is the same at the optical network unit (ONU) for every loop.

The desired receive PSD at the reference frequency can be computed using some reference loop, typically the longest loop in the binder. Alternatively, an arbitrary desired receive PSD level can be selected.

Denoting the reference frequency as $f_r$ and the desired receive PSD at that frequency as $S_r(f_r)$, the constant power back-off algorithm sets the transmit PSDs to $$S_i(f) = \min\left(\frac{S_r(f_r)}{|H_i(f_r)|^2}, S_{\max}(f)\right), \qquad \text{Equation 1}$$

where $|H_i(f_r)^2|$ is the value of the loop insertion loss at the reference frequency.

A reference length method is a generalization of the constant power back-off method. In contrast to the constant power back-off method, where a desired receive PSD is established at only a single frequency, the reference length method sets the upstream transmit PSD so that the received PSD at all frequencies is equal to the PSD that would be received if some known PSD were transmitted on a loop of length $L_r$. To compute the required transmit PSD, the desired receive PSD and loop attenuation within the upstream frequency bands must be known to the NT. The required transmit PSD is then simply the desired receive PSD divided by the loop attenuation profile.

Denoting the required transmit PSD as $S_i(f)$, the desired receive PSD as $S_r(f)$, and the loop attenuation as $|H_i(f)^2|$, the required transmit PSD is $$S_i(f) = \min\left(\frac{S_r(f)}{|H_i(f)|^2}, S_{\max}(f)\right). \qquad \text{Equation 2}$$

Applied strictly as defined above, the reference length method backs off the upstream transmit PSDs at all frequencies without taking into account the data-carrying capabilities of those frequencies on different length loops. As a result, all loops shorter than $L_r$ support approximately the same upstream rate as a loop of length $L_r$. Thus, support of mixed services is not readily enabled. Although some operators will choose not to provide mixed services in a binder, the power back-off algorithm should provide this capability, if possible.

The upstream bit rates on shorter loops can be improved by introducing a modification to the reference length method. The modification results from the observation that although systems on short loops transmit data in most or all of the available upstream bandwidth, systems on long loops use only the lower frequencies. Because higher-frequency bands are too attenuated to support data on longer loops that are most susceptible to near-far FEXT, allowing higher transmit PSD levels in these bands on shorter loops will not affect upstream bit rates on longer loops. Thus, the concept of a frequency-dependent reference length is introduced. The reference length should decrease with increasing frequency: it should be long at low frequencies and short at high frequencies. For example, at the lowest frequencies, a reference length of 1500 meters might be used, while at the highest frequencies a reference length of 300 or even 150 meters might be chosen.

With different reference lengths defined in different upstream frequency bands, the required transmit PSD is then computed as $$S_i(f) = \min\left(\frac{S_r(f)}{|H_i(f)|^2}, S_{\max}(f)\right) \qquad \text{Equation 3}$$

where $S_r(f)$ is the piece-wise defined desired receive PSD.

Ideally, the PSD transmitted on reference-length loops should be the maximum allowed. However, current standards have defined transmit PSD masks that far exceed the levels that can be supported under the total power constraint of 11.5 dBm set in current standards.

An equalized-FEXT method attempts to equalize, using a known FEXT model, the level of FEXT received on each line at the ONU/CO. The upstream transmit PSDs are adjusted so that all lines affect each other approximately equally. The method is similar in approach to the reference length method, however, the equalized FEXT method allows higher transmit PSDs at lower frequencies because FEXT coupling at these frequencies is less than at higher frequencies.

Using the equalized-FEXT method, a reference length is first chosen. Let the reference length be denoted $L_r$. The PSD received on loops of length $L_r$ is thus $$S_r(f) = |H_r(f)|^2 \cdot S_{max}(f). \qquad \text{Equation 4}$$

Hence, the transmit PSD on any loop should be $$S_i(f) = \min\left(\frac{L_r}{L_i} \cdot \frac{S_r(f)}{|H_i(f)|^2}, S_{\max}(f)\right), \qquad \text{Equation 5}$$

where $L_i$ is the length of the loop under consideration.

Thus, the required upstream transmit PSD on any line is the PSD transmitted on the reference loop times the ratio of the product of the reference loop length and insertion loss the product of the loop's own length and insertion loss.

It should be noted that the equalized-FEXT method can also be modified like the reference length method so that different reference lengths are used in different frequency bands. The expression for the desired receive PSD then takes a form similar to Equation 3.

Using a reference noise method, the upstream transmit PSD level is set such that the FEXT it would inject into another line of the same length is equal to an assumed reference noise. The upstream transmit PSDs are computed as $$S_i(f) = \min\left(\frac{L_r}{L_i} \cdot \frac{S_r(f)}{|H_i(f)|^2}, S_{\max}(f)\right), \qquad \text{Equation 6}$$

where $$S_r(f) = \frac{\eta(f)}{L_r \cdot K_{FEXT} \cdot f^2}.$$

Equation 7

In the expression for $S_r(f)$, $\eta(f)$ is an assumed reference noise, $K_{FEXT}$ is a constant representing the coupling from one loop to an adjacent loop in the cable, and $L_r$ is a nominal loop length. Note that $L_r$ cancels from the expression for $S_i(f)$. As discussed below, it will become clear why $L_r$ has been added to the equations for $S_i(f)$ and $S_r(f)$.

A comparison of Equations 1, 2, 3, 5 and 6 reveals that all the expressions for the upstream transmit PSD have generally the same form. All require the division of some desired receive PSD by the loop insertion loss. In some cases, multiplication and/or division by the loop length is also necessary.

The present invention defines and uses a global desired receive PSD (GDR PSD), denoted as $S_{GDR}(f)$. By defining a GDR PSD, virtually any power back-off algorithm can be accommodated. More importantly, the power back-off algorithm can be changed via the management interface simply by changing the GDR PSD that is sent to NTs during initialization.

Ignoring the maximum PSD mask constraint for the time being, we now examine how the GDR PSD is used with each of the aforementioned power back-off algorithms.

For constant power back-off, the GDR PSD is defined for only one frequency, $f_r$. Thus, the GDR PSD becomes $S_{GDR}(f_r)$, and the upstream transmit PSD on the i th loop is computed as $$S_i(f) = \frac{S_{GDR}(f_r)}{|H_i(f_r)|^2}.$$

Equation 8

In the case of the reference length method, the GDR PSD is defined as the PSD that would be received if a known PSD were transmitted on a loop of length $L_r$. The computed, required transmit PSD on the i th loop is simply $$S_i(f) = \frac{S_{GDR}(f)}{|H_i(f)|^2}.$$

Equation 9

In the multiple reference lengths method, the GDR PSD is defined piece-wise, with a different reference length in each defined frequency band. However, the expression for the computed upstream transmit PSD on the i th loop remains the same:

$$S_i(f) = \frac{S_{GDR}(f)}{|H_i(f)|^2}.$$

Equation 10

For the equalized-FEXT method, the computed upstream transmit PSDs are then given by $$S_i(f) = \frac{L_r}{L_i} \cdot \frac{S_{GDR}(f)}{|H_i(f)|^2}.$$

Equation 11

Note that the NT must normalize the GDR PSD by the ratio of the reference length to its own loop length when it computes the transmit PSD. Alternatively, if the loop length is determined via some procedure when the NT is installed, then the LT can perform the normalization. Then, however, the GDR PSD is no longer really "global", instead, it will vary from line to line. Hence, the GDR PSDs transmitted to different NTs will differ.

In a preferred embodiment, the reference noise method with GDR PSD is used for power back-off because performance degradations caused by use of the reference noise method can be shown to be bounded. As shown below, when two lines of arbitrary lengths are considered, the reference noise method results in an upstream performance degradation that is less than 3dB relative to when the two VTU-Rs reside on loops of the same length and transmit at the maximum allowed PSD. This result is significant because it means the performance degradation due to applying this power back-off algorithm is bounded regardless of the distribution of line lengths in a binder.

With the reference noise method, the upstream transmit PSDs are set to $$S_i(f) = \frac{\eta(f)}{K_{FEXT} \cdot |H_i(f)|^2 \cdot f^2 \cdot L_i},$$

Equation 12 where $\eta(f)$ is an assumed noise floor, $K_{FEXT}$ is a constant representing the coupling from one loop to an adjacent loop in the cable, $|H_i(f)|^2$ is the insertion loss of Loop i, and $L_i$ is the length of Loop i. All $S_i(f)$ are limited by the maximum allowable transmit PSD, which is denoted by $S_{max}(f)$. If the computed value of $S_i(f)$ exceeds $S_{max}(f)$, then the transmit PSD is constrained to $S_{max}(f)$.

An examination of Equation 12 reveals that the upstream transmit PSD level is such that the FEXT it would inject into another line of the same length is equal to the noise floor. Clearly, setting the PSD in this manner results in a 3 dB increase in the noise profile on a loop of the same length. Hence, the degradation to that line is 3 dB. In the following description, it is shown that even when two lines of different lengths are considered, the degradation to performance using this method is no greater than 3 dB relative to the performance with self-FEXT.

With this method, selection of an appropriate noise floor is required to compute the upstream transmit PSDs. If all upstream VDSL signals reside above approximately 2 MHz, then the total noise at each VTU-O should be composed only of VDSL FEXT and whatever noise is added by the transceiver itself. Clearly, impulse noise and radio-frequency interference cannot be assumed as part of the noise floor. If all transceivers are designed to have the same noise floor, then $\eta(f)$ should be this level. If all upstream VDSL signals do not reside above 2 MHz, then it is possible that noise other than FEXT and the receiver noise floor appears at the VTU-O. In this case, the noise floor has components that should be added to the receiver noise.

To simplify the problem, only two lines are considered. Of course, real cables will support more than two lines in a binder. Due to the manner in which cables are manufactured, however, it can be argued that the upstream performance on each loop will be most affected by, at most, 2 or 3 other loops. Thus, consideration of only two loops (i.e., one disturber) will provide some insight.

Figure 2:
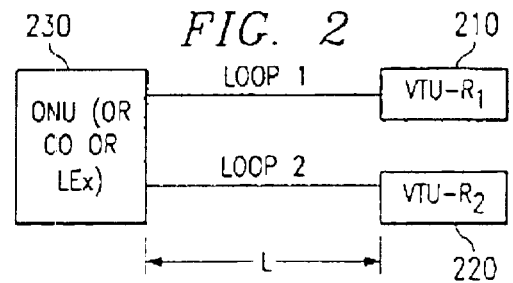
FIG. 2 illustrates a broadband communication system including two communication loops.

For performance with self-FEXT, we first establish the achievable performance when two lines of equal length reside in a binder, that is, with self-FEXT. FIG. 2 shows such a loop configuration. Two VTU-Rs 210, 220 are located on loops of length L, where the loop insertion losses of the two loops are denoted as $|H(f)|^2$. An ONU 230 is also located on the loops.

In the upstream direction, the PSD of FEXT caused by either line into the other is expressed by:

$$N_{FEXT}(f) = K_{FEXT} \cdot |H(f)|^2 \cdot f^2 \cdot L \cdot S(f),$$

Equation 13 where $K_{FEXT}$ is a constant representing the coupling from one loop to an adjacent loop in the cable, and S(f) is the upstream transmit PSD, which is assumed to be the same on both loops. The total noise received by the VTU-O on either loop is $$N_i(f) = K_{FEXT} \cdot |H(f)|^2 \cdot f^2 \cdot L \cdot S(f) + \eta(f), \quad \text{Equation 14}$$

where $\eta(f)$ is the noise floor.

Without loss of generality, assume $S(f) = S_{max}(f)$. The upstream SNRs on both loops are written as $$SNR_{i,self}(f) = \quad \text{Equation 15}$$

$$\frac{S_{max}(f) \cdot |H(f)|^2}{N_i(f)} = \frac{1}{K_{FEXT} \cdot |H(f)|^2 \cdot f^2 \cdot L \cdot S_{max}(f) + \eta(f)}.$$

Note that $$SNR_{i,self}(f) = \quad \text{Equation 16}$$

$$\frac{1}{K_{FEXT} \cdot f^2 \cdot L \cdot \left(1 + \frac{\eta(f)}{N_{FEXT}(f)}\right)} < \frac{1}{K_{FEXT} \cdot f^2 \cdot L}.$$

Hence, the SNR with self-FEXT is less than $$\frac{1}{K_{FEXT} \cdot f^2 \cdot L}$$

in the two-line case because both $\eta(f)$ and $N_{FEXT}(f)$ are non-negative functions.

Figure 3:
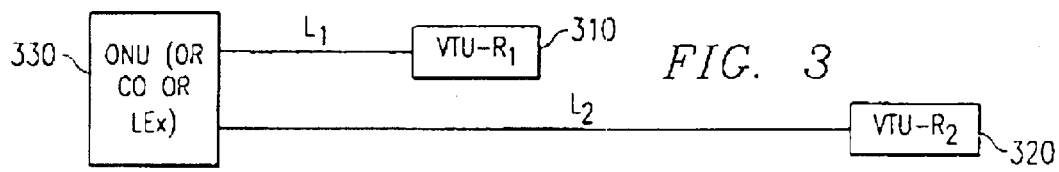
FIG. 3 illustrates a broadband communication system including two unequal-length communication loops which support VDSL.

Referring now to FIG. 3 there is illustrated a broadband communication configuration when two unequal-length lines support VDSL. Two VTU-Rs 310, 320 are located on the loops which also terminate at an ONU 330. Loop 1 and Loop 2 are lengths $L_1$ and $L_2$, respectively, where $L_1 < L_2$ without loss of generality.

The upstream transmit PSDs on the two lines are denoted as $S_1(f)$ and $S_2(f)$. The insertion losses of the two loops are denoted as $|H_1(f)|^2$ and $|H_2(f)|^2$.

As before, the FEXT received by the VTU-O on each line is due entirely to upstream transmissions on the other loop. The FEXT received by the VTU-O on Loop 1 is $$N_{1,FEXT}(f) = K_{FEXT} \cdot |H_2(f)|^2 \cdot f^2 \cdot L_1 \cdot S_2(f), \quad \text{Equation 17}$$

and the FEXT on Loop 2 is $$N_{2,FEXT}(f) = K_{FEXT} \cdot |H_1(f)|^2 \cdot f^2 \cdot L_1 \cdot S_1(f). \quad \text{Equation 18}$$

The received noise profiles at the VTU-O are then $$N_1(f) = K_{FEXT} \cdot |H_2(f)|^2 \cdot f^2 \cdot L_1 \cdot S_2(f) + \eta(f), \quad \text{Equation 19}$$

and $$N_2(f) = K_{FEXT} \cdot |H_1(f)|^2 \cdot f^2 \cdot L_1 \cdot S_1(f) + \eta(f). \quad \text{Equation 20}$$

It now is shown that in the two-line case, the maximum degradation to each line due to this power back-off algorithm is less than or equal to 3dB relative to the equal-length FEXT case. Three cases must be examined in the proof. Case 1 is when the computed values of both $S_1(f)$ and $S_2(f)$ lie under $S_{max}(f)$. Case 2 is when $S_1(f)$ lies under $S_{max}(f)$, but $S_2(f) = S_{max}(f)$. Case 3 is when the computed values of both $S_1(f)$ and $S_2(f)$ exceed $S_{max}(f)$ and are thus limited to $S_{max}(f)$.

Case 1: $S_1(f) < S_{max}(f)$ and $S_2(f) < S_{max}(f)$

In this case, $S_1(f) < S_{max}(f)$ and $S_2(f) < S_{max}(f)$, with $S_1(f)$ and $S_2(f)$ as defined in Equation 12. Substituting for $S_1(f)$ and $S_2(f)$, after some algebra, the SNRs at the VTU-O become $$SNR_1(f) = \frac{S_1(f) \cdot |H_1(f)|^2}{K_{FEXT} \cdot |H_2(f)|^2 \cdot f^2 \cdot L_i \cdot S_2(f) + \eta(f)} \quad \text{Equation 21}$$

$$= \frac{1}{K_{FEXT} \cdot f^2 \cdot L_1 \left(1 + \frac{L_1}{L_2}\right)}$$

and $$SNR_2(f) = \quad \text{Equation 22}$$

$$\frac{S_2(f) \cdot |H_2(f)|^2}{K_{FEXT} \cdot |H_1(f)|^2 \cdot f^2 \cdot L_i \cdot S_1(f) + \eta(f)} = \frac{1}{2 K_{FEXT} \cdot f^2 \cdot L_2}$$

Now we compare Equations 21 and 22 to the maximum SNRs in Equation 16. Relative to when $L = L_1$, we see that $$SNR_1(f) > \frac{1}{2} \cdot SNR_1, \text{self}(f) \quad \text{Equation 23}$$

and, relative to when $L = L_2$, $$SNR_2\left((f) > \frac{1}{2} \cdot SNR_2, \text{self}(f)\right). \quad \text{Equation 24}$$

Therefore, relative to when both loops are length LI the loss on Loop 1 due to setting the upstream PSDs using this method is less than 3 dB. Relative to when both loops are length $L_2$ the loss on Loop 2 is less than 3 dB.

Case 2: $S_1(f) < S_{max}(f)$, $S_2(f) = S_{max}(f)$

In this case, $S_1(f)$ lies under $S_{max}(f)$, but $S_2(f) = S_{max}(f)$. We know that in this case the computed value of $S_2(f)$ was greater than allowed by $S_{max}(f)$. Hence, $$K_{FEXT} \cdot |H_2(f)|^2 \cdot f^2 \cdot L_1 \cdot S_{max}(f) < \eta(f). \quad \text{Equation 25}$$

Using this observation, the SNR at the VTU-O on Loop 1 becomes $$SNR_1(f) = \quad \text{Equation 26}$$

$$\frac{S_1(f) \cdot |H_1(f)|^2}{K_{FEXT} \cdot |H_2(f)|^2 \cdot f^2 \cdot L_1 \cdot S_{max}(f) + \eta(f)} > \frac{S_1(f) \cdot |H_1(f)|^2}{\eta(f) + \eta(f)}$$

Substituting for $S_1(f)$ and simplifying, we find that $$SNR_1(f) > \frac{1}{2 K_{FEXT} \cdot f^2 \cdot L_1} \quad \text{Equation 27}$$

Thus, $$SNR_1(f) > \frac{1}{2} \cdot SNR_{1,self}(f) \quad \text{Equation 28}$$

The upstream SNR on Loop 2 is $$SNR_2(f) = \frac{S_{\max}(f) \cdot |H_2(f)|^2}{K_{FEXT} \cdot |H_1(f)|^2 \cdot f^2 \cdot L_1 \cdot S_1(f) + \eta(f)} = \frac{S_{\max}(f) \cdot |H_2(f)|^2}{\eta(f) + \eta(f)} \quad \text{Equation 29}$$

We note that $$\frac{1}{2} \cdot SNR_{2,self}(f) = \frac{S_{\max}(f) \cdot |H_2(f)|^2}{2K_{FEXT} \cdot |H_2(f)|^2 \cdot f^2 \cdot L_2 \cdot S_{\max}(f) + 2\eta(f)}. \quad \text{Equation 30}$$

Thus, $$SNR_2(f) >= \frac{1}{2} \cdot SNR_{2,self}(f). \quad \text{Equation 31}$$

Again, the degradations relative to the self-FEXT cases are limited to less than 3 dB.

Case 3: $S_1(f) = S_2(f) = S_{max}(f)$

In this case, the computed values of $S_1(f)$ and $S_2(f)$ both exceed $S_{max}(f)$. Thus both transmit PSDs are set to smax $S_{max}(f)$. Therefore, $$K_{FEXT} \cdot |H_1(f)|^2 \cdot f^2 \cdot L_1 \cdot S_{max}(f) < \eta(f) \quad \text{Equation 32}$$

and $$K_{FEXT} \cdot |H_2(f)|^2 \cdot f^2 \cdot L_1 \cdot S_{max}(f) < \eta(f). \quad \text{Equation 33}$$

The upstream SNR on Loop 1 is $$SNR_1(f) = \frac{S_{\max}(f) \cdot |H_1(f)|^2}{K_{FEXT} \cdot |H_2(f)|^2 \cdot f^2 \cdot L_1 \cdot S_{\max}(f) + \eta(f)} > \quad \text{Equation 34}$$

$$\frac{S_{\max}(f) \cdot |H_1(f)|^2}{\eta(f) + \eta(f)}$$

while the upstream SNR on Loop 2 is $$SNR_2(f) = \frac{S_{\max}(f) \cdot |H_2(f)|^2}{K_{FEXT} \cdot |H_1(f)|^2 \cdot f^2 \cdot L_1 \cdot S_{\max}(f) + \eta(f)} > \quad \text{Equation 35}$$

$$\frac{S_{\max}(f) \cdot |H_2(f)|^2}{\eta(f) + \eta(f)}$$

which leads directly to the results that $$SNR_1(f) >= \frac{1}{2} \cdot SNR_{1,self}(f). \quad \text{Equation 36}$$

and $$SNR_2(f) >= \frac{1}{2} SNR_{2,self}(f). \quad \text{Equation 37}$$

Thus, we have shown that in the two-line case, the maximum degradation relative to the self-FEXT case is less than 3 dB using the reference noise method of upstream power back-off. We hypothesize that when additional lines are considered, the bound will increase slightly.

When the reference noise method is used, the GDR PSD must be normalized by the ratio of a nominal loop length to the loop length to compute the required transmit PSD:

$$S_i(f) = \frac{L_r}{L_i} \cdot \frac{S_{GDR}(f)}{|H_1(f)|^2}. \quad \text{Equation 38}$$

Again, the normalization can be absorbed into the GDR PSD if transmission of a different GDR PSD to each NT is acceptable. It should be clear to the reader now why the factor $L_r$ was incorporated into the expression for $S_i(f)$. Without this factor, the GDR PSD is not actually a PSD.

As above-described, all aforementioned upstream power back-off methods can be defined using the GDR PSD. In some cases, the upstream transmit PSD is computed simply by dividing the GDR PSD by the loop insertion loss. Other methods derived from FEXT equations require normalization by a ratio of loop lengths. By choosing the appropriate GDR PSD, operators can tailor the power back-off to meet their service requirements, including mixed services known in the art.

Figure 4:
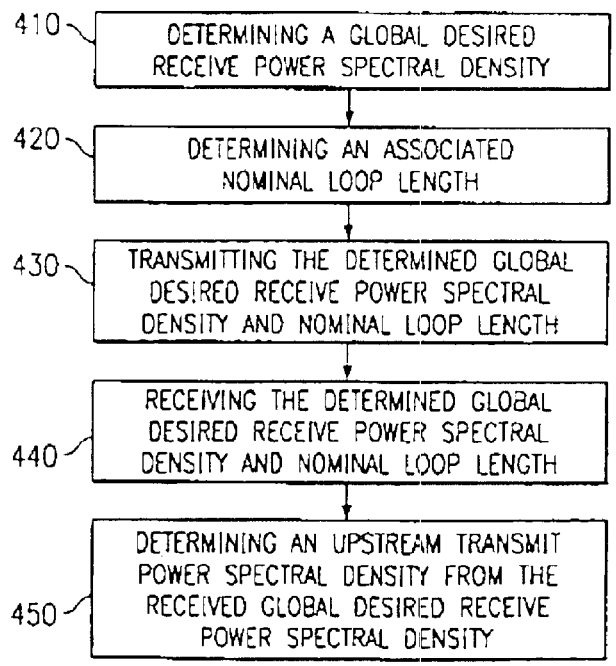
FIG. 4 shows a method of upstream power back-off in a broadband communication system in accordance with the present invention.

Referring now to FIG. 4 there is shown a method for upstream power back-off in a broadband communication system in accordance with the present invention. According to the present invention, power back-off is applied in the upstream direction, NT→LT, so that crosstalk from systems on short lines does not unduly compromise service on long lines. The global desired receive power spectral density (GDR PSD) is determined 410 and denoted $S_{GDR}(f)$ defined as $$S_{GDR}(f) = \frac{\eta(f)}{L_r \cdot K_{FEXT} \cdot f^2}, \quad \text{Equation 39}$$

where $\eta(f)$ is an assumed reference noise profile, $L_i$ is a determined nominal loop length 420, and $K_{FEXT}$ is a constant representing the coupling from one loop to an adjacent loop in the cable.

The GDR PSD and a nominal loop length $L_r$ are transmitted 430 by the LT and is received 440 by the NT during initialization. If the value of $L_r$ is non-zero, the NT uses an estimate of the length of the loop, $L_i$, and determines the upstream transmit power spectral density 450 as, $$S(f) = \frac{L_r}{L_i} \frac{S_{GDR}(f)}{|H(f)|^2}, \quad \text{Equation 40}$$

where $|H(f)|^2$ is the estimated insertion loss of the loop. Transmission by the LT of a value of 0 for $L_r$ shall indicate no normalization of the GDR PSD is necessary, and the NT determnines the upstream transmit power spectral density 450 as, $$S(f) = \frac{S_{GDR}(f)}{|H(f)|^2}. \quad \text{Equation 41}$$

The estimation of the loop length can occur during initialization or, if that is deemed too risky, during the installation procedure. Alternatively, all loops can be assumed to be the same length, such as 1km. Simulations show this approximation does not dramatically degrade the performance of at least the reference noise method. If a reasonable estimation of the loop length is not possible, a back-off algorithm that is independent of the loop length (such as multiple reference lengths) can be selected.

In either case, the upstream transmit PSD shall be no greater than $$\min(S(f), S_{max}(f)), \quad \text{Equation 42}$$

where $S_{max}(f)$ is the maximum allowed upstream transmit PSD.

In a preferred embodiment, the NT performs power back-off autonomously, that is, without sending any information to the LT until back-off has been applied, however, the management system provides the facility to change parameters of the $S_{GDR}(f)$ and $L_r$. Hence, the reference noise profile η(f) and nominal loop length is operator-configurable via the management system. The same GDR PSD and nominal length are used by all NTs in the same binder.

This proposal offers a number of benefits, and particularly the following: (1) Power back-off can be performed by the NT before it transmits any data to the LT. Defining the GDR PSD enables the NT to perform a simple computation to determine the required transmit PSD; and (2) The power back-off parameters can be changed via the management system. Operators can change power back-off parameters using the management system. By defining a GDR PSD, the back-off parameters, and even the algorithm itself, can be changed. Hence, operators are not "locked in" to a specific back-off algorithm or parameter set.

Although a preferred embodiment of the method and system of the present invention has been illustrated in the accompanied drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method of upstream power back-off in a broadband communication system, said method comprising:
   transmitting a global desired receive power spectral density (GDR PSD);
   determining an upstream transmit power spectral density prior to upstream data transmission using said transmitted GDR PSD; and
   providing a management system enabling operator configuration of said GDR PSD.

2. The method of claim 1 further comprising enabling transmission of said GDR PSD, during an initialization phase, from an associated line termination interface to a network termination interface which determines said upstream transmit power spectral density prior to upstream transmission.

3. The method of claim 2, wherein said line termination interface further enables transmission of a nominal loop length, during initialization, wherein said upstream transmit power spectral density associated with said network termination interface is determined by:

$$S(f) = \frac{L_r S_{GDR}(f)}{L_i |H(f)|^2},$$

where $L_r$ is a non-zero value representing said nominal loop length, $L_i$ is a length of a transmission loop associated with said network termination interface, $S_{GDR}(f)$ is said GDR PSD, and $|H(f)|^2$ is an estimated insertion loss of said associated transmission loop.

4. The method of claim 3, wherein said upstream transmit power spectral density is no greater than:

$$\min(S(f), S_{max}(f)),$$

where $S_{max}$ is a predetermined allowed upstream transmit power spectral density.

5. The method of claim 3, wherein said upstream transmit power spectral density is determined by:

$$S(f) = \frac{S_{GDR}(f)}{|H(f)|^2},$$

for transmission of a zero value for said nominal loop length.

6. The method of claim 5, wherein said upstream transmit power spectral density is no greater than:

$$\min(S(f), S_{max}(f)),$$

where $S_{max}$ is a predetermined allowed upstream transmit power spectral density.

7. The method of claim 1, wherein said GDR PSD is further defined as:

$$S_{GDR}(f) = \frac{\eta(f)}{L_r \cdot K_{FEXT} \cdot f^2},$$

where η(f) is an assumed reference noise profile, $L_r$ is a determined nominal loop length, and $K_{FEXT}$ is a constant representing the coupling from a first loop to an adjacent loop in said communication system.

8. The method of claim 7, wherein said GDR PSD and nominal loop length are transmitted from said line termination interface to said network termination interface during an initialization phase, wherein power back-off associated with said network termination interface is determined prior to upstream transmission.

9. The method of claim 1, wherein, for a constant power back-off approach, said upstream transmit power spectral density is defined as a ratio of said GDR PSD to an associated loop insertion loss at a predetermined frequency.

10. The method of claim 1, wherein, for reference length and multiple reference length power back-off approaches, said upstream transmit power spectral density is defined as a ratio of said GDR PSD to an associated loop insertion loss at a set of frequencies.

11. The method of claim 1, wherein, for equalized-FEXT and reference noise power back-off approaches, said upstream transmit power spectral density is defined as a ratio of said GDR PSD to an associated loop insertion loss which is normalized by a ratio of a reference loop length to a transmit loop length.

12. A system of upstream power back-off in a broadband communication network, said system comprising:
   a line termination interface enabling transmission of a predetermined global desired receive power to spectral density (GDR PSD);
   a network termination interface enabling determination of an upstream transmit power spectral density prior to upstream data transmission using said transmitted GDR PSD; and
   a management interface enabling operator configuration of said GDR PSD.

13. The system of claim 12, wherein said line termination interface further enabling transmission of said GDR PSD to said network termination interface during an initialization phase, wherein said network termination interface subsequently determines said upstream transmit power spectral density.

14. The system of claim 13, wherein said line termination interface further enabling transmission of a predetermined nominal loop length, during initialization, wherein said upstream transmit power spectral density associated with said network termination interface is determined by:

$$S(f) = \frac{L_r S_{GDR}(f)}{L_i |H(f)|^2},$$

where $L_r$ is a non-zero value representing said nominal loop length, $L_i$ is a length of a transmission loop associated with said network termination interface, $S_{GDR}(f)$ is said GDR PSD, and $|H(f)|^2$ is an estimated insertion loss of said associated transmission loop.

15. The system of claim 14, wherein said upstream transmit power spectral density is no greater than:

$$\min(S(f), S_{max}(f)),$$

where $S_{max}$ is a predetermined allowed upstream transmit power spectral density.

16. The system of claim 14, wherein said upstream transmit power spectral density is determined by:

$$S(f) = \frac{S_{GDR}(f)}{|H(f)|^2},$$

for transmission of a zero value for said nominal loop length.

17. The method of claim 12, wherein said GDR PSD is further defined as:

$$S_{GDR}(f) = \frac{\eta(f)}{L_r \cdot K_{FEXT} \cdot f^2},$$

where $\eta(f)$ is an assumed reference noise profile, $L_r$ is a nominal loop length, and $K_{FEXT}$ is a constant representing the coupling from a first loop to an adjacent loop in the cable.

18. The system of claim 17, wherein said line termination interface further enables transmission of said GDR PSD and nominal loop length during an initialization phase.

19. The method of claim 12, wherein, for a constant power back-off approach, said upstream transmit power spectral density is defined as a ratio of said GDR PSD to an associated loop insertion loss at a predetermined frequency.

20. The method of claim 12, wherein, for reference length and multiple reference length power back-off approaches, said upstream transmit power spectral density is defined as a ratio of said GDR PSD to an associated loop insertion loss at a set of frequencies.

21. The system of claim 12, wherein, for equalized-FEXT and reference noise power back-off approaches, said upstream transmit power spectral density is defined as a ratio of said GDR PSD to an associated loop insertion loss which is normalized by a ratio of a reference loop length to a transmit loop length.

22. A method of upstream power back-off in a broadband communication system comprising at least two transmission loops of differing lengths, said method comprising:

determining a global desired receive power spectral density (GDR PSD) and a nominal loop length;

transmitting said GDR PSD and nominal loop length, wherein said transmission is enabled by a line termination type interface;

receiving said GDR PSD and nominal loop length, wherein said receiving is enabled by a network termination type interface;

said network termination type interface further enabling determination of an upstream transmit power spectral density defined as:

$$S(f) = \frac{L_r S_{GDR}(f)}{L_i |H(f)|^2},$$

where $L_i$ is a determined length of a transmission loop associated with said network termination type interface, $|H(f)|^2$ is an estimated insertion loss of said associated transmission loop, and $S_{GDR}(f)$ represents said GDR PSD defined as:

$$S_{GDR}(f) = \frac{\eta(f)}{L_r \cdot K_{FEXT} \cdot f^2},$$

where $\eta(f)$ is an assumed reference noise profile, $L_r$ is a nominal loop length, and $K_{FEXT}$ is a constant representing the coupling from a first loop to an adjacent loop in communication system the cable.

* * * * *